(12) United States Patent
Hayes et al.

(10) Patent No.: US 11,464,278 B2
(45) Date of Patent: Oct. 11, 2022

(54) METHODS OF MAKING AN ORTHOTIC FOOTBED ASSEMBLY

(71) Applicant: Superfeet Worldwide LLC, Ferndale, WA (US)

(72) Inventors: Eric Paris Hayes, Ferndale, WA (US); Ryan James Anderson, Ferndale, WA (US); Stephanie Whalen, San Francisco, CA (US); Henry Madden, San Ramon, CA (US); Todd Taylor, San Jose, CA (US)

(73) Assignee: Superfeet Worldwide LLC, Ferndale, WA (US)

( * ) Notice: Subject to any disclaimer, the term of this patent is extended or adjusted under 35 U.S.C. 154(b) by 1652 days.

(21) Appl. No.: 15/187,454

(22) Filed: Jun. 20, 2016

(65) Prior Publication Data

US 2017/0360148 A1 Dec. 21, 2017

(51) Int. Cl.
*B33Y 80/00* (2015.01)
*A43B 7/14* (2022.01)
(Continued)

(52) U.S. Cl.
CPC .............. *A43B 7/1455* (2013.01); *A43B 7/12* (2013.01); *A43B 7/14* (2013.01); *A43B 7/141* (2013.01);
(Continued)

(58) Field of Classification Search
CPC ......... B33Y 80/00; A43B 7/1455; A43B 7/14; A43B 7/22; A43B 7/1405; A43B 7/28;
(Continued)

(56) References Cited

U.S. PATENT DOCUMENTS 5,611,153 A * 3/1997 Fisher ..................... A43B 7/14
36/173
6,141,889 A * 11/2000 Baum ................. A43B 13/223
36/140
(Continued)

FOREIGN PATENT DOCUMENTS

CN 101801228 A 8/2010
CN 101951798 A 1/2011
(Continued)

OTHER PUBLICATIONS

International Search Report; dated Sep. 6, 2017; 4 Pages.
(Continued)

*Primary Examiner* — Katharine G Kane
(74) *Attorney, Agent, or Firm* — Lowe Graham Jones PLLC

(57) ABSTRACT

In at least some embodiments, an orthotic footbed assembly includes a three-dimensional footbed that closely approximates a size and configuration of a particular foot and at least one orthotic feature additively coupled to the three-dimensional footbed. In at least some other embodiments, a method of making the orthotic footbed assembly includes direct printing of orthotic features onto a 3-D footbed. Another method includes indirect printing of orthotic features and applying these features onto to a 3-D footbed. And yet another method includes direct printing of orthotic features onto a 2-D blank footbed and then conducting a three-dimensional forming operation to make the orthotic footbed assembly.

15 Claims, 4 Drawing Sheets

(51) Int. Cl.
*A43B 7/1455* (2022.01)
*A43D 1/02* (2006.01)
*A43B 7/1405* (2022.01)
*A43B 17/00* (2006.01)
*A43B 7/12* (2006.01)
*A43B 7/22* (2006.01)
*A43B 7/28* (2006.01)

(52) U.S. Cl.
CPC ............. *A43B 7/1405* (2013.01); *A43B 7/22* (2013.01); *A43B 7/28* (2013.01); *A43B 17/003* (2013.01); *A43D 1/025* (2013.01); *B33Y 80/00* (2014.12)

(58) Field of Classification Search
CPC .. A43B 7/141; A43B 7/12; A43D 1/02; A43D 1/025; A43D 1/027
USPC ................... 36/43, 145, 154, 178, 181, 155
See application file for complete search history.

(56) References Cited

U.S. PATENT DOCUMENTS

| | | | | |
|---|---|---|---|---|
| 6,549,639 | B1* | 4/2003 | Genest | A43D 1/025 382/100 |
| 6,654,705 | B1* | 11/2003 | Benson | A43D 1/025 702/152 |
| 6,823,550 | B2* | 11/2004 | Kantro | A43B 7/141 12/142 N |
| 7,008,386 | B2* | 3/2006 | Alaimo | A43B 1/0045 12/142 N |
| 7,310,564 | B2* | 12/2007 | Leyerer | A43B 7/143 12/146 M |
| 7,392,559 | B2* | 7/2008 | Peterson | A61B 5/1036 12/1 R |
| 7,489,813 | B2 | 2/2009 | Rutschmann | |
| 8,036,768 | B2* | 10/2011 | Lowe | A43B 13/223 36/140 |
| 8,117,922 | B2* | 2/2012 | Xia | G06Q 30/02 73/862.041 |
| 8,538,570 | B2* | 9/2013 | Stanhope | G01B 5/008 700/98 |
| 9,020,626 | B2* | 4/2015 | Spector | A43B 17/00 700/118 |
| 2004/0133431 | A1* | 7/2004 | Udiljak | A43D 1/025 705/26.1 |
| 2005/0261869 | A1* | 11/2005 | Leyerer | A43B 17/00 702/150 |
| 2007/0163147 | A1* | 7/2007 | Cavanagh | A61B 5/6807 36/44 |
| 2009/0044426 | A1* | 2/2009 | Levine | A43B 7/28 36/88 |
| 2009/0071038 | A1* | 3/2009 | Luthi | A43B 17/023 36/91 |
| 2009/0076772 | A1* | 3/2009 | Hinshaw | A43D 1/025 702/167 |
| 2009/0183388 | A1* | 7/2009 | Miller | G06F 30/00 36/43 |
| 2011/0113647 | A1* | 5/2011 | Levine | A43B 7/141 36/44 |
| 2014/0149072 | A1* | 5/2014 | Rutschmann | A61B 5/1036 12/1 R |
| 2014/0180185 | A1* | 6/2014 | Zachariasen | A43B 7/141 12/142 N |
| 2015/0000157 | A1* | 1/2015 | Hikichi | A43D 1/025 702/167 |
| 2015/0165690 | A1* | 6/2015 | Tow | A43B 7/14 36/173 |
| 2015/0210015 | A1* | 7/2015 | Schouwenburg | G06Q 30/02 73/862.041 |
| 2016/0101572 | A1* | 4/2016 | Schouwenburg | A43D 1/025 705/26.1 |
| 2016/0110479 | A1* | 4/2016 | Li | A43B 1/0045 12/142 N |
| 2016/0125499 | A1* | 5/2016 | Gooch | A43D 1/025 382/100 |
| 2016/0213094 | A1* | 7/2016 | Matsui | A61B 5/1074 |
| 2016/0235158 | A1* | 8/2016 | DesJardins | A43B 13/20 |

FOREIGN PATENT DOCUMENTS

| | | |
|---|---|---|
| CN | 104699908 A | 6/2015 |
| CN | 104908319 A | 9/2015 |
| EP | 1980224 A2 | 10/2008 |
| EP | 3001925 A1 | 4/2016 |
| GB | 2508204 A | 5/2014 |
| KR | 1020140147443 A | 12/2014 |
| WO | 2009089406 A | 7/2009 |
| WO | 2011061714 A1 | 5/2011 |
| WO | 2014080217 A1 | 5/2014 |
| WO | 201420356 A1 | 12/2014 |
| WO | 2016075429 A1 | 5/2016 |

OTHER PUBLICATIONS

Michael Moltch-Hou, SOLS Announces Launch of 3D Printed Orthotics Across the US, 3 Pages.
GO-TEC Innovation System Technology, GP LaserScan 3D, 1 Page.
Scan 3D FS Laser Scanning System, 2 pages.
3D Print a Custom Shoe Insole, 10 pages.
Second Office Action dated Mar. 17, 2021 for co-pending Chinese Patent Application No. 201780050735.7, 50 pages.
First Office Action dated Aug. 28, 2020 for co-pending Chinese Patent Application No. 201780050735.7, 18 pages.
Decision on Rejection dated Oct. 9, 2021 for co-pending Chinese Patent Application No. 201780050735.7, 14 pages.

* cited by examiner

METHODS OF MAKING AN ORTHOTIC FOOTBED ASSEMBLY

FIELD OF THE INVENTION

The present invention is generally directed to methods of making an orthotic footbed assembly, and more specifically directed to methods of making the orthotic footbed assembly by direct printing orthotic features onto a three-dimensional ("3-D") footbed, by indirect printing orthotic features and applying them onto to a 3-D footbed, and direct printing orthotic features onto a 2-D blank and then conducting a three-dimensional forming operation.

BRIEF SUMMARY

In at least one aspect of the present invention, a method of making an orthotic footbed assembly includes the steps of (1) scanning a customer's foot; (2) based on the scan, selecting a three-dimensional footbed that most closely approximates a size and configuration of the customer's foot; (3) based on the scan, determining at least one orthotic feature for the three-dimensional footbed; and (4) directly printing the at least one orthotic feature onto the three-dimensional footbed.

In at least another aspect of the present invention, a method of making an orthotic footbed assembly includes the steps of (1) scanning a customer's foot; (2) based on the scan, selecting a three-dimensional footbed that most closely approximates a size and configuration of the customer's foot; (3) based on the scan, determining at least one orthotic feature to be printed onto a substrate; (4) directly printing the at least one orthotic feature onto the substrate; and (5) securing the at least one orthotic feature onto the three-dimensional footbed.

In yet another aspect of the present invention, an orthotic footbed assembly includes a three-dimensional footbed that closely approximates a size and configuration of a particular foot and at least one orthotic feature additively coupled to the three-dimensional footbed.

BRIEF DESCRIPTION OF THE DRAWINGS

Preferred and alternative embodiments of the present invention are described in detail below with reference to the following drawings.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with footwear, insoles, midsoles, non-removable soles, footbeds, orthotics, combinations thereof, and methods of making the same, have not necessarily been shown or described in detail to avoid unnecessarily obscuring descriptions of the embodiments of the invention.

In at least some embodiments, the present invention is directed to a method or process of directly printing one or more orthotic features onto a three-dimensional (3-D) footbed (hereinafter 3-D footbed) to create a 3-D orthotic footbed assembly according to an embodiment of the present invention. In another embodiment, the present invention is directed to printing one or more orthotic features onto an adhesive substrate, applying the orthotic feature onto a 3-D footbed or onto a two-dimensional (2-D) blank or substrate (hereinafter 2-D blank). In the latter instance, the 2-D blank with the orthotic features adhered thereto is subsequently formed or shaped into a 3-D orthotic footbed assembly. In yet another alternative embodiment, the present invention is directed to printing one or more orthotic features directly onto a 2-D blank and then forming or shaping the 2-D blank into a 3-D orthotic footbed assembly. These methods, various combinations of these methods, and additions thereto are described in more detail below. For purposes of the description, claims, other text and drawings herein, a footbed should be broadly interpreted as any platform, support or other structure that runs under the bottom of a person's foot. The footbed may take the form of, but is not limited to, an insole, a midsole, a sandal sole, or an inner sole (sometimes referred to as an innersole).

Printing an entire footbed assembly can be quite time-consuming. Further, much of the footbed is fairly common from one person to another with respect to foot size and general foot shape. Thus, the present invention provides a process to produce a custom footbed assembly that, according to at least one embodiment, starts with a 3-D footbed that closely approximates the foot of person. 3-D orthotic features are then printed onto or secured onto the 3-D footbed to account for foot specifics of a particular customer that were not adequately addressed by the stock 3-D footbed.

Figure 1A:
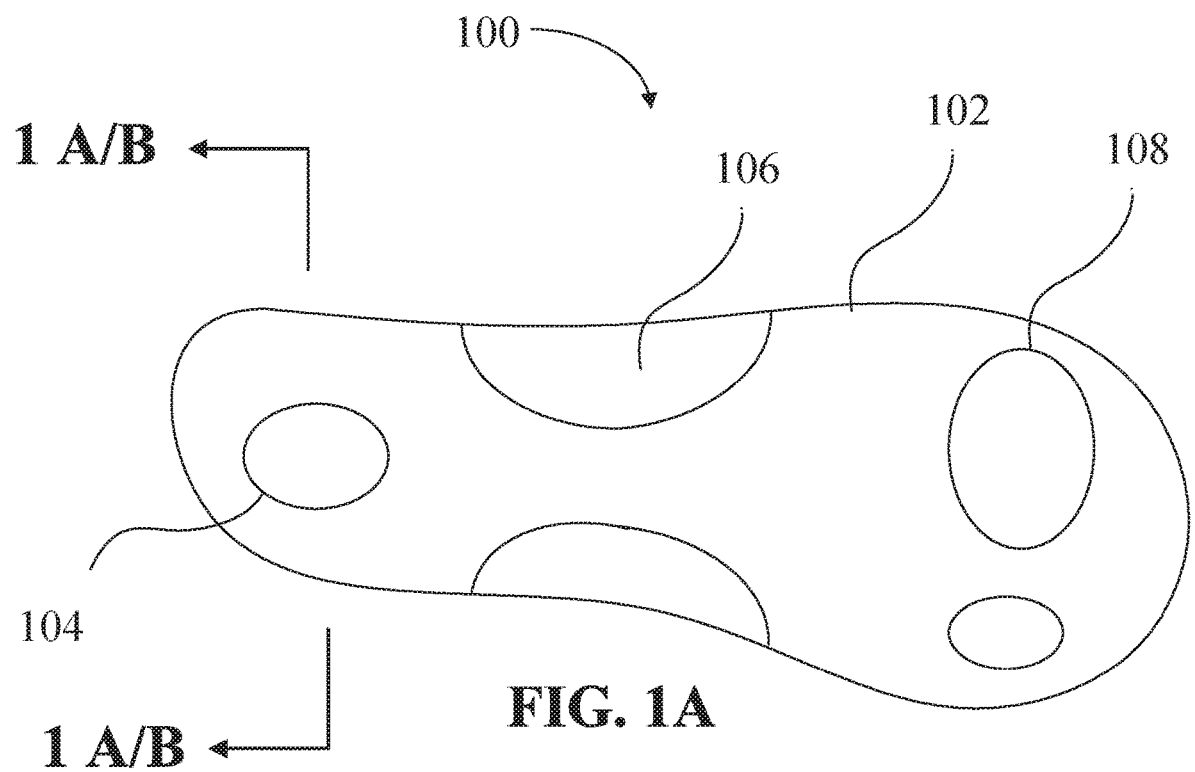
FIG. 1A is a schematic, plan view of an orthotic footbed assembly according to an embodiment of the present invention.
Figure 1B:
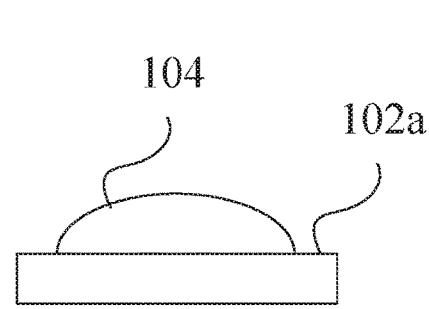
FIG. 1B is a cross-sectional view of the orthotic footbed assembly of FIG. 1A having an orthotic feature applied to a 2-D blank according to an embodiment of the present invention.
Figure 1C:
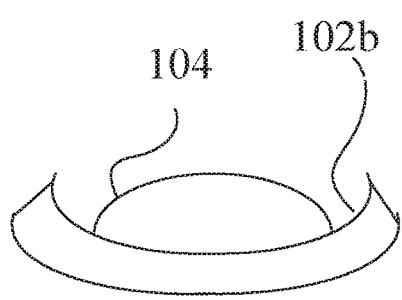
FIG. 1C is a cross-sectional view of the orthotic footbed assembly of FIG. 1A having an orthotic feature applied to a 3-D footbed according to an embodiment of the present invention.

FIG. 1A shows an orthotic footbed assembly 100 having a footbed 102, at least one heel orthotic feature 104, at least one medial or lateral orthotic feature 106, and at least one forward orthotic feature 108. FIG. 1B shows the heel orthotic feature 104 applied to a 2-D flat or planar blank 102a while FIG. 1C shows the heel orthotic feature 104 applied to a 3-D footbed 102b.

The footbed 102 may take the form of a standard, off-the-shelf footbed base structure or some other type of footwear item (e.g., shoes, sandals, flip-flops, etc.). It may alternatively be a generalized footbed base or midsole created to fit a large cross section of people of a certain foot size, gender, and race. Such a toothed or midsole could be specially created to include regions designated to receive added orthotic features, either to be printed directly thereon or secured thereon with adhesive or other methods. Thus, the generalized base or black may even have recesses therein to receive the orthotic features.

The footbed 102 may be 3-D or 2-D when obtained. In one embodiment, the footbed takes the form of a flat blank that is stamped, pressed, or otherwise formed into a curved configuration. The term "orthotic feature" may take the form of a raised or a depressed region printed directly onto the footbed or made separately and subsequently attached to the footbed. For purposes of the description herein, the term "orthotic" should be broadly interpreted as any element, component, device or support, especially for the foot, used to relieve or correct an orthopedic problem, provide a therapeutic benefit, assist with walking or wearing comfort of a footwear item, provide some other type of benefit or improvement for a wearer of the footbed assembly, or any combination thereof. The direct application of the orthotic feature onto the footbed may be accomplished by techniques such as, but not limited to, stereolithography, 3-D printing, additive printing or additive manufacturing, and other techniques where material may be selectively added to a footbed, substrate, or blank in thin layers.

Figure 2:
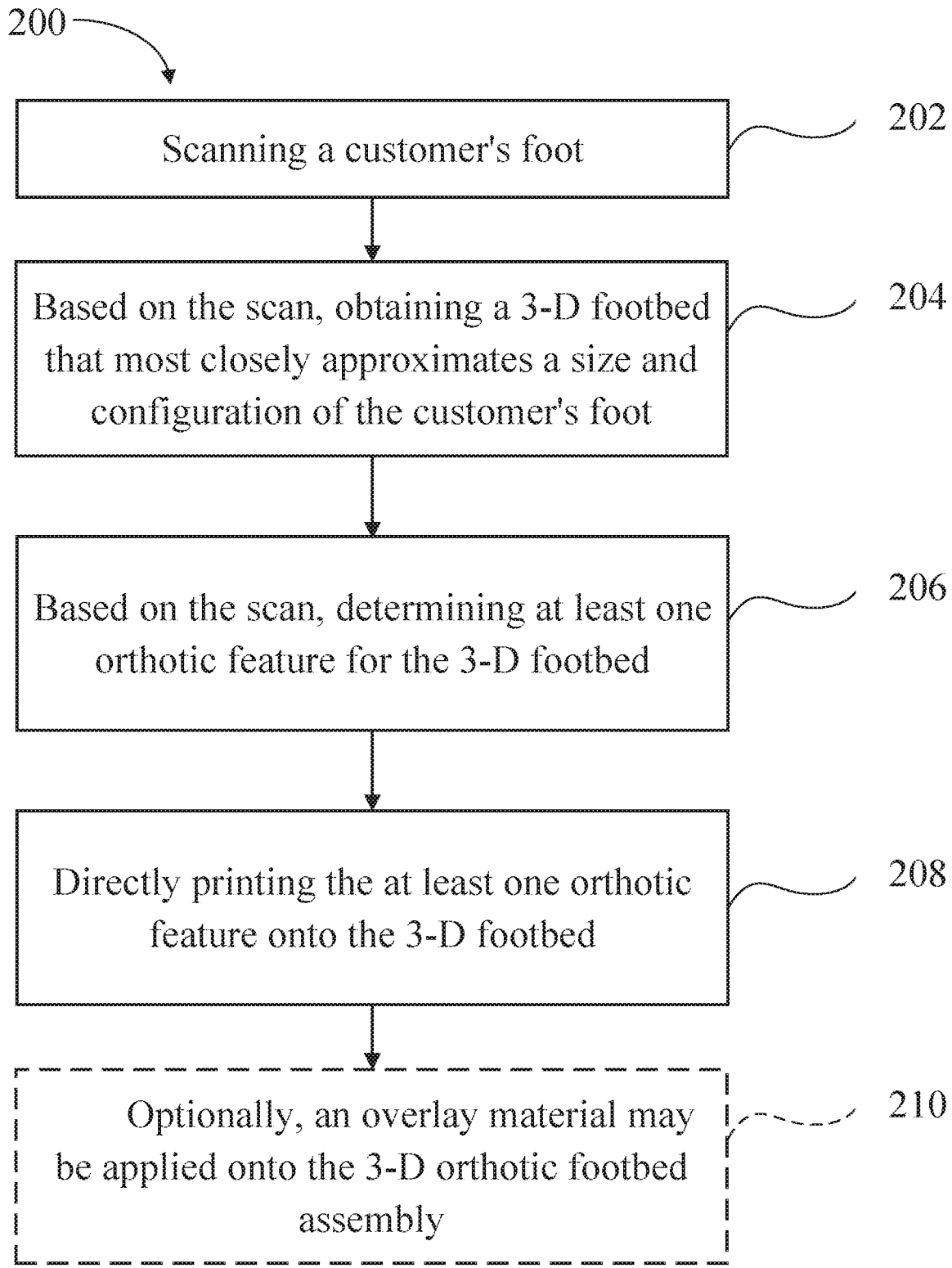
FIG. 2 is a method for making an orthotic footbed assembly by direct printing onto a 3-D footbed according to an embodiment of the present invention.

FIG. 2 shows a method 200 for making a customized orthotic footbed assembly. At Step 202, the customer's foot is scanned to determine a variety of aspects and information about the customer's foot. For purposes of this description, the term "scan" should be broadly interpreted to include any physical, analog or digital technique that may be used to obtain information about the foot. In at least some embodiments, scanning the customer's foot includes performing a plantar digital foot scanning procedure to capture a volumetric foot model, and in particular capture the crucial posterior calcaneus of the foot. In at least some other embodiments, scanning the customer's foot includes performing a diagnostic ultrasound that produces images of internal foot structures through the use of high-frequency sound waves, whose echoes are used to create moving and still images of the muscles, tendons, ligaments, joints and other soft tissue in the foot and ankle. In still other embodiments, scanning the customer's foot includes performing a digital orthotic scanning that generates a 3-D map of the foot, which effectively images the biomechanical structure and at least some foot abnormalities. In still yet other embodiments, scanning the customer's foot includes using optical (e.g., laser) scanners that capture a contour and position of the posterior aspect of the heel as well as other aspects or portions of the foot. Imaging the posterior aspect of the heel may help in evaluating the forefoot-to-rearfoot relationship, which is a parameter that may be used in making a customized orthotic footbed assembly. Additionally or alternatively, any of the aforementioned scanning techniques may be used in conjunction with plaster casts, foam box impressions and other physical approximation techniques.

At Step 204, at least one 3-D footbed is selected or otherwise obtained. The 3-D footbed may include various curves and contours that be selected based on the scan of the foot. Alternatively, the 3-D footbed may be unrelated to the scan and merely have a general shape that corresponds to a foot. The 3-D footbed may be selected from a variety of footbeds ranging in size, width, material, density, and other parameters. Additionally or alternatively, the 3-D footbed may be special ordered or made for a certain type of foot.

At Step 206 and based on the scan, at least one orthotic feature is determined for the 3-D footbed. At Step 208, at least one orthotic feature is directly printed onto the 3-D footbed to form a 3-D orthotic footbed assembly. At Step 210, an overlay material may be optionally applied onto the 3-D orthotic footbed assembly. In at least one embodiment, the overlay material may be a soft overlay material such as, but not limited to, a foam or a dense foam. It may also be an overlying fabric material as an overlay or on top of the foam to form an overlay as a combination of foam and fabric.

Figure 3:
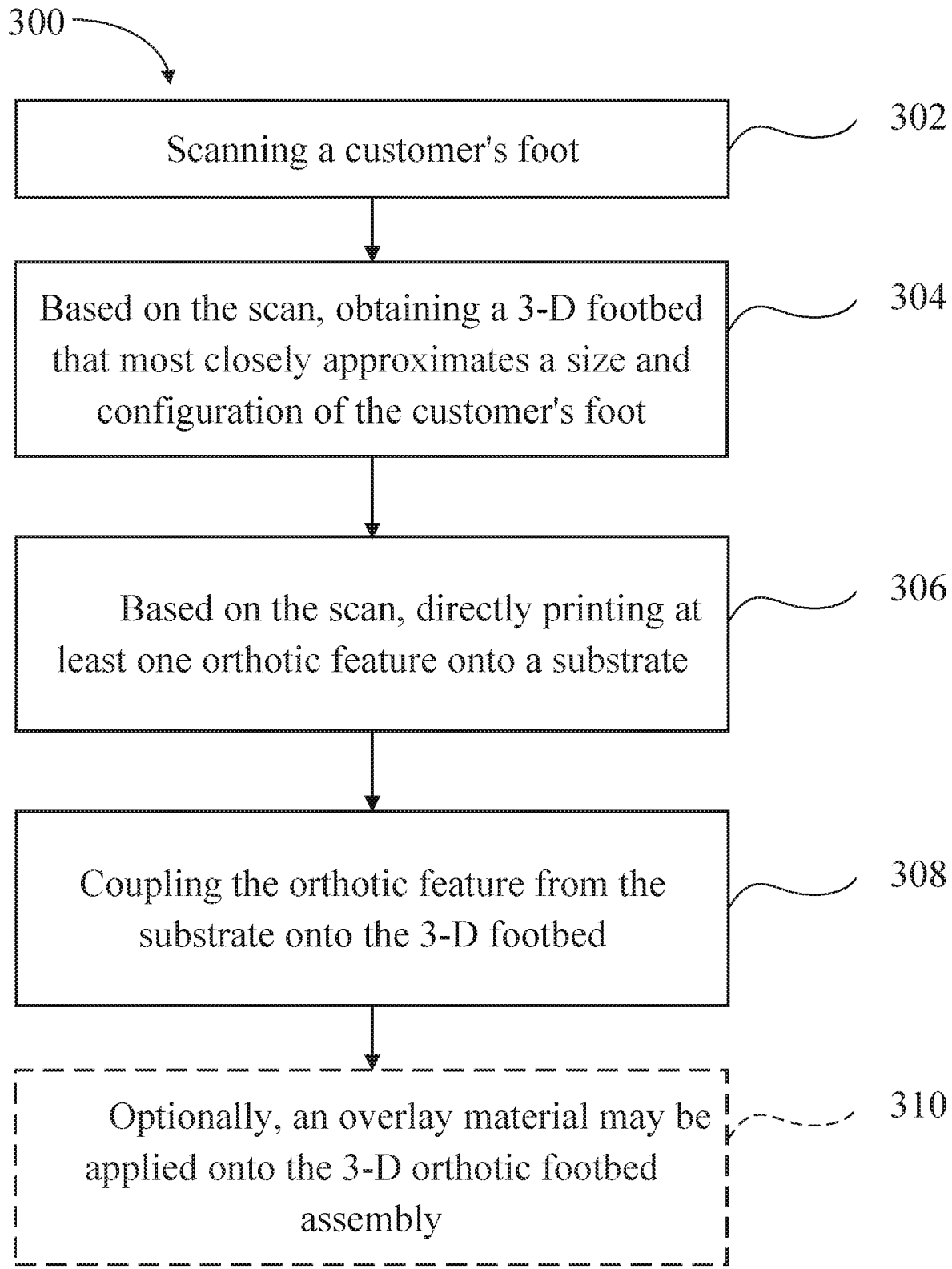
FIG. 3 is a method for making an orthotic footbed assembly by indirect printing onto a substrate according to an embodiment of the present invention.

FIG. 3 shows a method 300 for making a 3-D customized orthotic footbed assembly that starts with a 3-D footbed. Step 302 is the same as Step 202 (FIG. 2) in which the customer's foot is scanned to determine a variety of aspects and information about the customer's foot.

At Step 304, at least one 3-D footbed is selected or otherwise obtained. The 3-D footbed may generally include various curves and contours that are not selected from the scan of the foot. Stated otherwise, the 3-D footbed is unrelated to the scan and merely includes a general shape that corresponds to a foot. The 3-D footbed may be selected from a variety of footbeds ranging in size, width, material, density and other parameters. Additionally or alternatively, the 3-D footbed may be special ordered or made for a certain type of foot.

At Step 306, at least one orthotic feature is directly printed onto a substrate such as, but not limited to, an adhesive substrate. Based on the scan of the foot, one or more orthotic features are printed onto the adhesive substrate. At Step 308 and according to the present embodiment, the orthotic features are adhesively coupled to or adhesively attached to the 3-D blank to create a low-cost, 3-D customized orthotic footbed assembly, which may be quickly produced. At Step 310, an overlay material may be optionally applied onto the 3-D orthotic footbed assembly.

Figure 4:
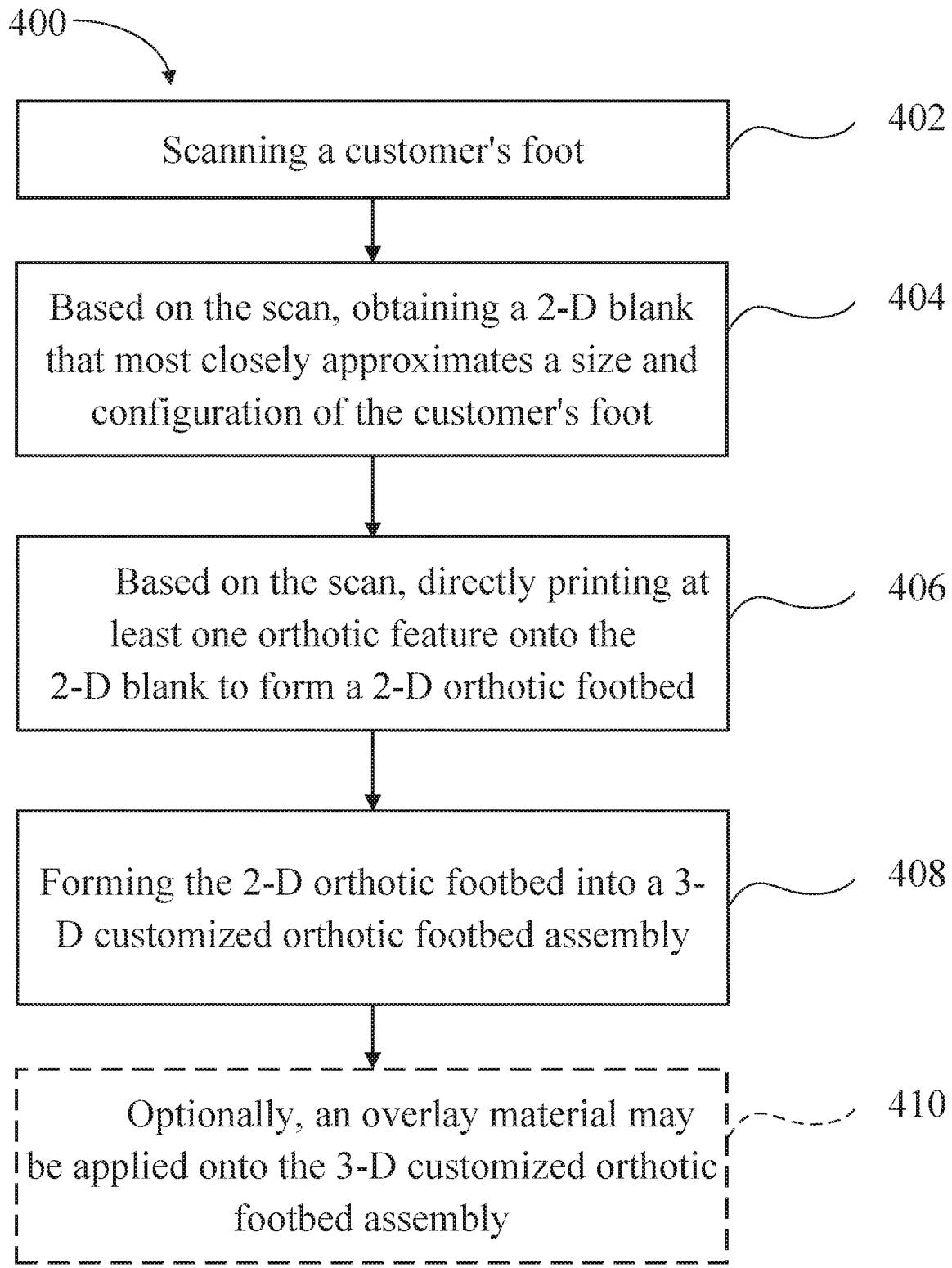
FIG. 4 is a method for making an orthotic footbed assembly by direct printing onto a 2-D blank according to an embodiment of the present invention.

FIG. 4 shows a method 400 for making a 3-D customized orthotic footbed assembly that starts with a 2-D blank or footbed. Step 402 is the same as Step 202 (FIG. 2) in which the customer's foot is scanned to determine a variety of aspects and information about the customer's foot.

At Step 404, at least one 2-D blank or blank is obtained. The 2-D blank is generally flat or planar, but may include various curves and contours along a length and width of the 2-D structure. In at least some embodiments, the 2-D blank is unrelated to the scan (e.g., standard) and merely includes a general shape that corresponds to foot. The 2-D blank may be selected from a variety of blanks ranging in size, width, material, density, and other parameters. Additionally or alternatively, the 2-D blank may be special ordered or made for a certain type of foot.

At Step 406, at least one orthotic feature is directly printed onto the 2-D blank based on the scan of the foot to for a 2-D orthotic footbed. At Step 408 and according to the present embodiment, the 2-D orthotic footbed is formed or shaped into a 3-D customized orthotic footbed assembly. At Step 410, an overlay material may be optionally applied onto the 3-D orthotic footbed assembly.

While preferred embodiments of the invention have been illustrated and described, as noted above, many changes can be made without departing from the spirit and scope of the invention. In addition, other advantages will also be apparent to those of skill in the art with respect to any of the above-described embodiments will whether viewed individually or in some combination thereof. Accordingly, the scope of the invention is not limited by the disclosure of the preferred embodiment. Instead, the invention should be determined entirely by reference to the claims that follow.

What is claimed as new and desired to be protected by Letters Patent of the United States is:

1. A method of making an orthotic footbed assembly, the method comprising:
  scanning a customer's foot;
  based on the scan, selecting from an inventory of pre-manufactured three-dimensional footbeds a pre-manufactured three-dimensional footbed that most closely approximates a size and configuration of the customer's foot;

based on the scan, determining at least one orthotic feature for the pre-manufactured three-dimensional footbed; and directly printing the at least one orthotic feature onto the pre-manufactured three-dimensional footbed.

2. The method of claim 1, wherein scanning includes digital, optical imaging.

3. The method of claim 1, wherein scanning includes ultrasound imaging.

4. The method of claim 1, wherein determining at least one orthotic feature includes determining a location where additional material is to be added to the pre-manufactured three-dimensional footbed.

5. The method of claim 1, wherein directly printing includes three-dimensional printing.

6. The method of claim 1, wherein directly printing includes additive manufacturing.

7. The method of claim 1, further comprising applying an overlay material onto the orthotic footbed assembly.

8. A method of making an orthotic footbed assembly, the method comprising:

scanning a customer's foot;

based on the scan, selecting a pre-manufactured three-dimensional footbed that most closely approximates a size and configuration of the customer's foot;

based on the scan, determining at least one orthotic feature to be printed on a substrate;

directly printing the at least one orthotic feature onto the substrate; and securing the at least one orthotic feature onto the pre-manufactured three-dimensional footbed.

9. The method of claim 8, wherein scanning includes ultrasound imaging.

10. The method of claim 8, wherein determining at least one orthotic feature includes determining a location where additional material is to be added to the pre-manufactured three-dimensional footbed.

11. The method of claim 8, wherein directly printing includes three-dimensional printing.

12. The method of claim 8, further comprising applying an overlay material onto the orthotic footbed assembly.

13. The method of claim 1, wherein the pre-manufactured three-dimensional footbed includes regions designated to receive added orthotic features.

14. The method of claim 8, wherein the pre-manufactured three-dimensional footbed includes regions designated to receive added orthotic features.

15. The method of claim 8, wherein the substrate is an adhesive substrate, and securing the at least one orthotic feature onto the pre-manufactured three-dimensional footbed comprises adhesively coupling or attaching the at least one orthotic feature to the pre-manufactured three-dimensional footbed.

* * * * *